(12) United States Patent
Wang et al.

(10) Patent No.: US 12,283,674 B2
(45) Date of Patent: Apr. 22, 2025

(54) BATTERY BOX

(71) Applicant: CONTEMPORARY AMPEREX TECHNOLOGY (HONG KONG) LIMITED, Hong Kong (CN)

(72) Inventors: Heng Wang, Ningde (CN); Jinqing Ji, Ningde (CN); Wenhui Zhang, Ningde (CN); Mu Qian, Ningde (CN); Yanhuo Xiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 656 days.

(21) Appl. No.: 17/138,597

(22) Filed: Dec. 30, 2020

(65) Prior Publication Data
US 2021/0119279 A1    Apr. 22, 2021

Related U.S. Application Data

(63) Continuation of application No. PCT/CN2019/126001, filed on Dec. 17, 2019.

(30) Foreign Application Priority Data

Dec. 29, 2018 (CN) .......................... 201822266635.2

(51) Int. Cl.
*H01M 10/6554* (2014.01)
*H01M 6/50* (2006.01)
(Continued)

(52) U.S. Cl.
CPC ......... *H01M 10/6554* (2015.04); *H01M 6/50* (2013.01); *H01M 6/5038* (2013.01);
(Continued)

(58) Field of Classification Search
CPC .. H01M 6/50; H01M 6/5038; H01M 10/6554; H01M 10/613; H01M 10/653;
(Continued)

(56) References Cited

U.S. PATENT DOCUMENTS

2016/0288737 A1    10/2016 Kamimura et al.
2017/0294693 A1*   10/2017 Tong ................. H01M 10/6556

FOREIGN PATENT DOCUMENTS

CN    207116549 U       3/2018
CN    108365156    *    8/2018 .......... H01M 10/613
(Continued)

OTHER PUBLICATIONS

English Translation of CN 108365156.*
(Continued)

*Primary Examiner* — Kiran Quraishi Akhtar
(74) *Attorney, Agent, or Firm* — K&L Gates LLP

(57) ABSTRACT

This application provides a battery box, which includes: a heat exchange plate and a lower frame body located on the heat exchange plate. The lower frame body includes edge beams and internal beams, the edge beams forming a circumferential closure opened in an up-down direction, the edge beams and the heat exchange plate together forming an accommodating space with an upward opening, and the internal beams located inside the accommodating space and divide the accommodating space into sub-accommodating spaces for placing battery modules. The heat exchange plate is configured to support the battery modules and exchanges heat with batteries of the battery modules, and a bottom plane of an internal beam is partly in contact with a top plane of the heat exchange plate in the up-down direction.

13 Claims, 6 Drawing Sheets

(51) Int. Cl.
*H01M 10/613* (2014.01)
*H01M 50/209* (2021.01)
*H01M 50/244* (2021.01)
*H01M 50/264* (2021.01)

(52) U.S. Cl.
CPC ....... *H01M 10/613* (2015.04); *H01M 50/209* (2021.01); *H01M 50/244* (2021.01); *H01M 50/264* (2021.01)

(58) Field of Classification Search
CPC ............ H01M 50/209; H01M 50/244; H01M 50/264; Y02E 60/10
See application file for complete search history.

(56) References Cited

FOREIGN PATENT DOCUMENTS

| | | |
|---|---|---|
| CN | 108365156 A | 8/2018 |
| CN | 207818674 U | 9/2018 |
| CN | 209183612 U | 7/2019 |
| EP | 3086475 A1 | 10/2016 |

OTHER PUBLICATIONS

Contemporary Amperex Technology Co., Limited, Extended European Search Report, EP19903870.4, Sep. 10, 2021, 7 pgs.
Contemporary Amperex Technology Co., Limited, International Search Report and Written Opinion, PCT/CN2019126001, Mar. 24, 2020, 14 pgs.

* cited by examiner

BATTERY BOX

CROSS REFERENCE TO RELATED APPLICATIONS

This application is a continuation application of PCT Patent Application No. PCT/CN2019/126001, entitled "BATTERY BOX" filed on Dec. 17, 2019, which claims priority to Chinese Patent Application No. 201822266635.2, filed with the State Intellectual Property Office of the People's Republic of China on Dec. 29, 2018, and entitled "BATTERY BOX", all of which are incorporated herein by reference in their entirety.

TECHNICAL FIELD

This application relates to the battery field, and in particular, to a battery box.

BACKGROUND

In the battery field, a battery box includes a lower frame body and a heat exchange plate. The lower framer body and the heat exchange plate form an accommodating space for accommodating a battery module. The lower housing includes a plurality of beams. The battery module includes a plurality of arranged batteries and is supported on the heat exchange plate. The heat exchange plate supports the batteries and exchanges heat with the batteries.

A battery generally needs to stay at a constant temperature range to ensure stability and constancy of the operating temperature of the battery.

However, because the heat exchange plate is fixed to the beams of the lower frame body, the entire bottom planes of the beams are in contact with the heat exchange plate. Therefore, there is heat transfer between the heat exchange plate and the beams of the lower frame body, which affects the heat exchange effect of the heat exchange plate on the batteries and the stability and constancy of the operating temperature of the battery.

SUMMARY

In view of the problem existing in the prior art, an objective of this application is to provide a battery box, which can reduce heat exchange between a heat exchange plate and bottom planes of internal beams.

In order to achieve the above object, this application provides a battery box, which includes: a heat exchange plate; a lower frame body located on the heat exchange plate, where the lower frame body includes edge beams and internal beams, the edge beams form a circumferential closure opened in an up-down direction, the edge beams and the heat exchange plate together form an accommodating space with an upward opening, and the internal beams are located inside the accommodating space and divide the accommodating space into sub-accommodating spaces for placing battery modules; the heat exchange plate is used to support the battery modules and exchanges heat with batteries of the battery modules, and a bottom plane of an internal beam is partly in contact with a top plane of the heat exchange plate in the up-down direction.

In an embodiment, the bottom plane of the internal beam includes: a first plane, which is in contact with the top plane of the heat exchange plate; and a second plane, which is recessed upwardly with respect to the first plane from a side of the first plane in a direction that intersects with the up-down direction, so that the second plane is spaced apart from the top plane of the heat exchange plate in the up-down direction.

In an embodiment, the battery box further includes heat insulation glue, the heat insulation glue being filled between the second plane of the bottom plane of the internal beam and the top plane of the heat exchange plate.

In an embodiment, the bottom plane of the internal beam further includes a third plane, which is recessed upwardly with respect to the first plane from another side of the first plane opposite to the direction that intersects with the up-down direction, so that the third plane is spaced apart from the top plane of the heat exchange plate in the up-down direction.

In an embodiment, the battery box further includes heat insulation glue, which is filled between the third plane and the top plane of the heat exchange plate.

In an embodiment, the top plane of the heat exchange plate is flat in general.

In an embodiment, the heat exchange plate has a main body and a bulge extending from the main body. A downside of the bulge is recessed upwardly with respect to the main body, and an upside of the bulge protrudes upwardly with respect to the main body. The bulge has a top surface constituting part of the top plane and an inclined plane. The inclined plane is located laterally to the top surface along the direction intersecting with the up-down direction. The bottom plane of the internal beam is partly in contact with the top surface of the bulge, and the inclined plane of the bulge is spaced apart from the top plane of the heat exchange plate in the up-down direction.

In an embodiment, the battery box further includes heat insulation glue, which is filled between the bottom plane of the internal beam and the inclined plane of the bulge.

In an embodiment, a notch is provided on a lateral surface of the internal beam facing toward the battery.

In an embodiment, the internal beam has an accommodating cavity located above a location where the bottom plane of the internal beam contacts the top plane of the heat exchange plate. The battery box further includes a fastener which passes through the heat exchange plate and the internal beam at the location where the bottom plane of the internal beam contacts the top plane of the heat exchange plate and extends into the accommodating cavity. A part of the fastener extending into the accommodating cavity is spaced apart from a wall of the accommodating cavity.

The beneficial effects of this application are as follows: by making the bottom plane of the internal beam partly in contact with the top plane of the heat exchange plate in the up-down direction, the contact area between the bottom plane of the internal beam and the top plane of the heat exchange plate is reduced. This reduces the heat exchange between the heat exchange plate and the bottom plane of the internal beam, and in turn the impact on the heat exchange between the heat exchange plate and the battery modules (mainly the batteries) is reduced, and the stability, constancy and controllability of the operating temperature of the batteries are improved.

Figure 1:
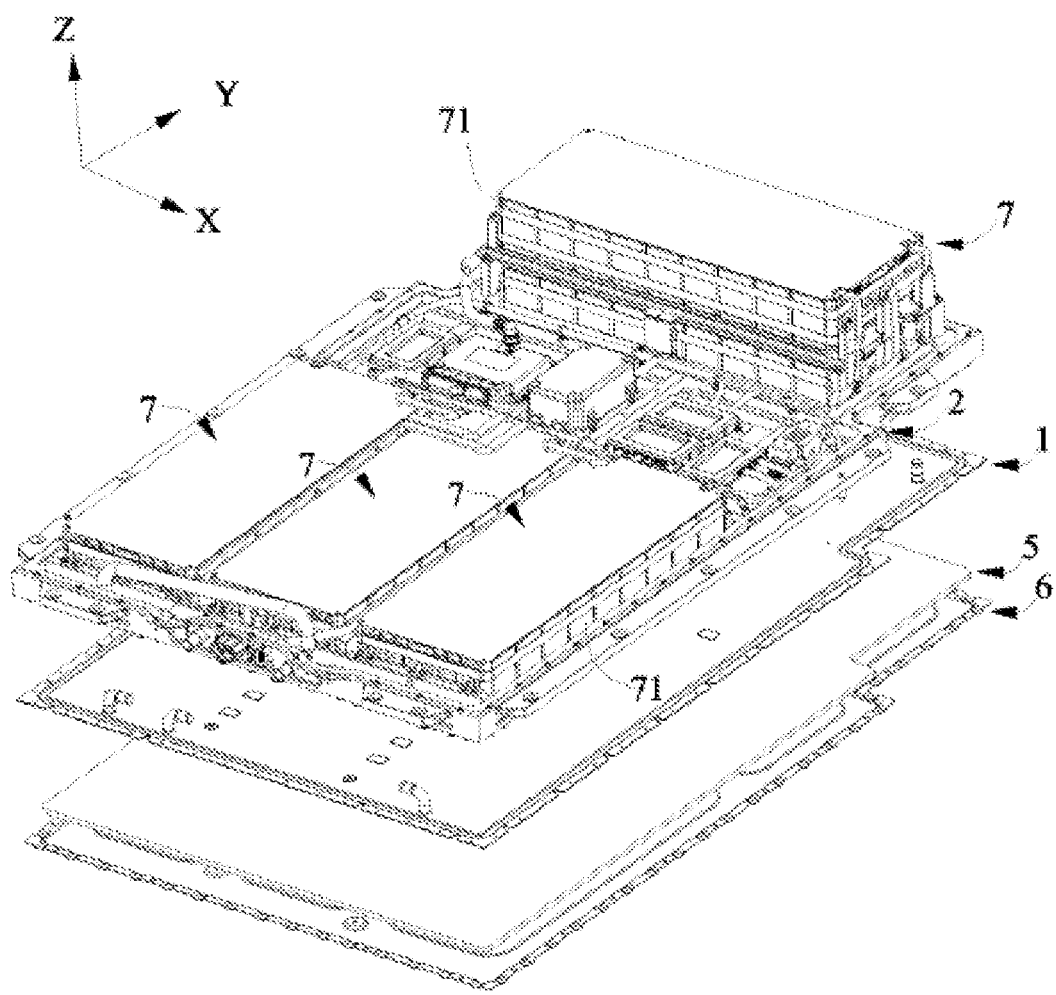
FIG. 1 is a perspective view of a battery box according to this application, where battery modules are shown for the sake of clarity.

| | |
|---|---|
| X. left-right direction | 22. internal beam |
| Y. forward-back direction | B22. bottom plane |
| Z. up-down direction | B221. first plane |
| 1. heat exchange plate | B222. second plane |
| T11. top plane | B223. third plane |
| 12. main body | 224. lateral surface |
| 121. upper surface | 224a. notch |
| 13. bulge | 225. accommodating cavity |
| 131. top surface | R. sub-accommodating space |
| 132. inclined plane | 3. heat insulation glue |
| 14. first plate | 4. fastener |
| 15. second plate | 5. heat insulation pad |
| F. flow passage | 6. protective plate |
| 2. lower frame body | 7. battery module |
| 21. edge beam | 71. battery |

DESCRIPTION OF EMBODIMENTS

The accompanying drawings illustrate embodiments of this application and it is understood that the disclosed embodiments are merely examples of this application, which may be implemented in various forms. Therefore, specific details disclosed herein are not to be interpreted as limiting, but merely as a basis for the claims and as a representative basis for teaching one skilled in the art to implement this application in various ways.

Additionally, expressions such as up, down, left, right, front, and back that are used to indicate directions for the operations and construction of the constituent components in the embodiments are not absolute but rather relative. Such indications are appropriate when these components are in the locations illustrated in the drawings; however, these directions should be interpreted differently when these locations change, in order to correspond to the changes.

Figure 2:
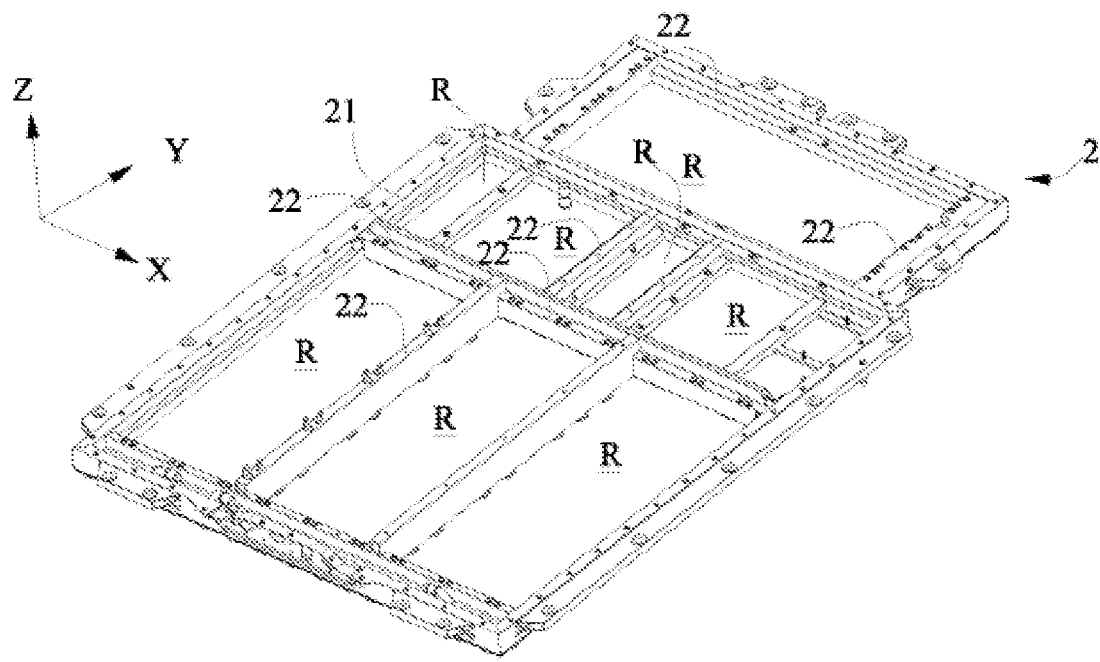
FIG. 2 is a perspective view of assembly of the battery box according to this application.
Figure 3:
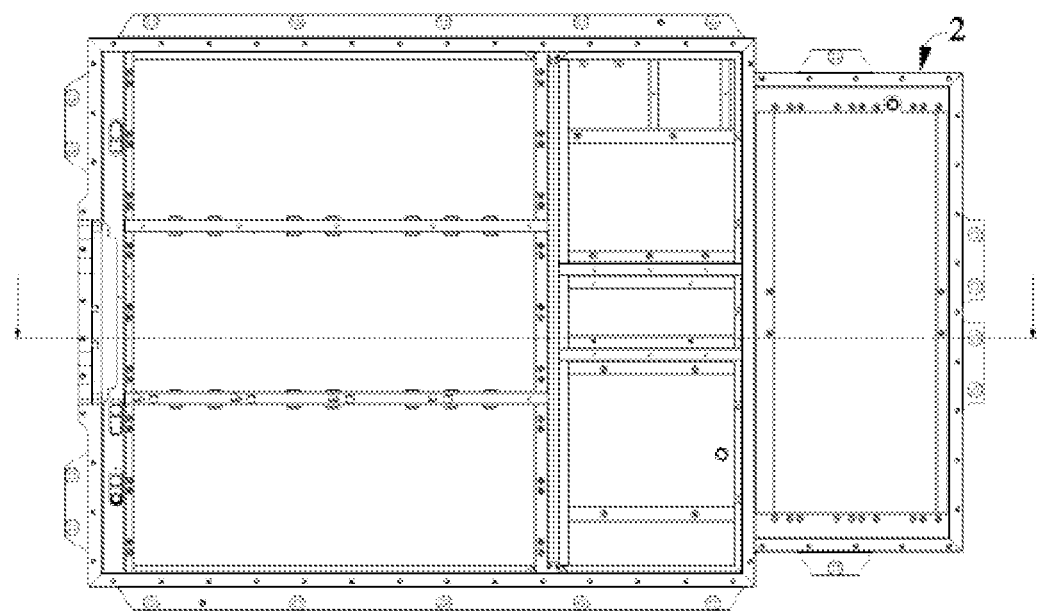
FIG. 3 is a vertical view of FIG. 2.
Figure 4:
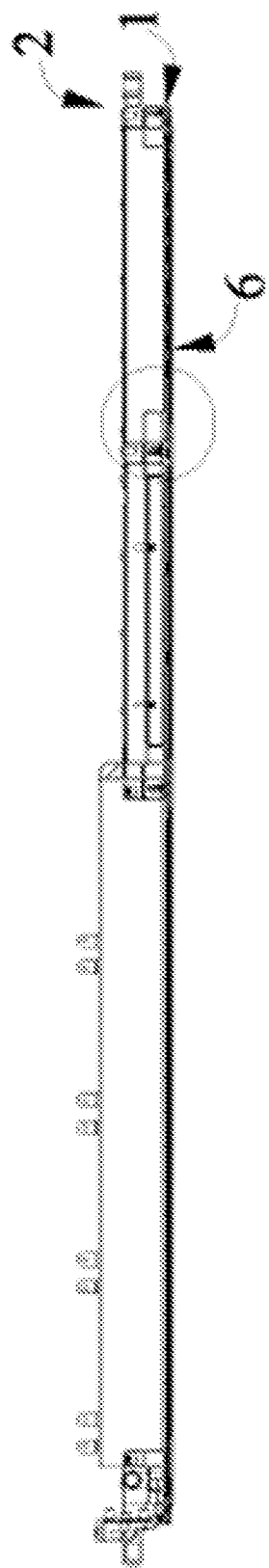
FIG. 4 is a sectional view of FIG. 3.
Figure 5:
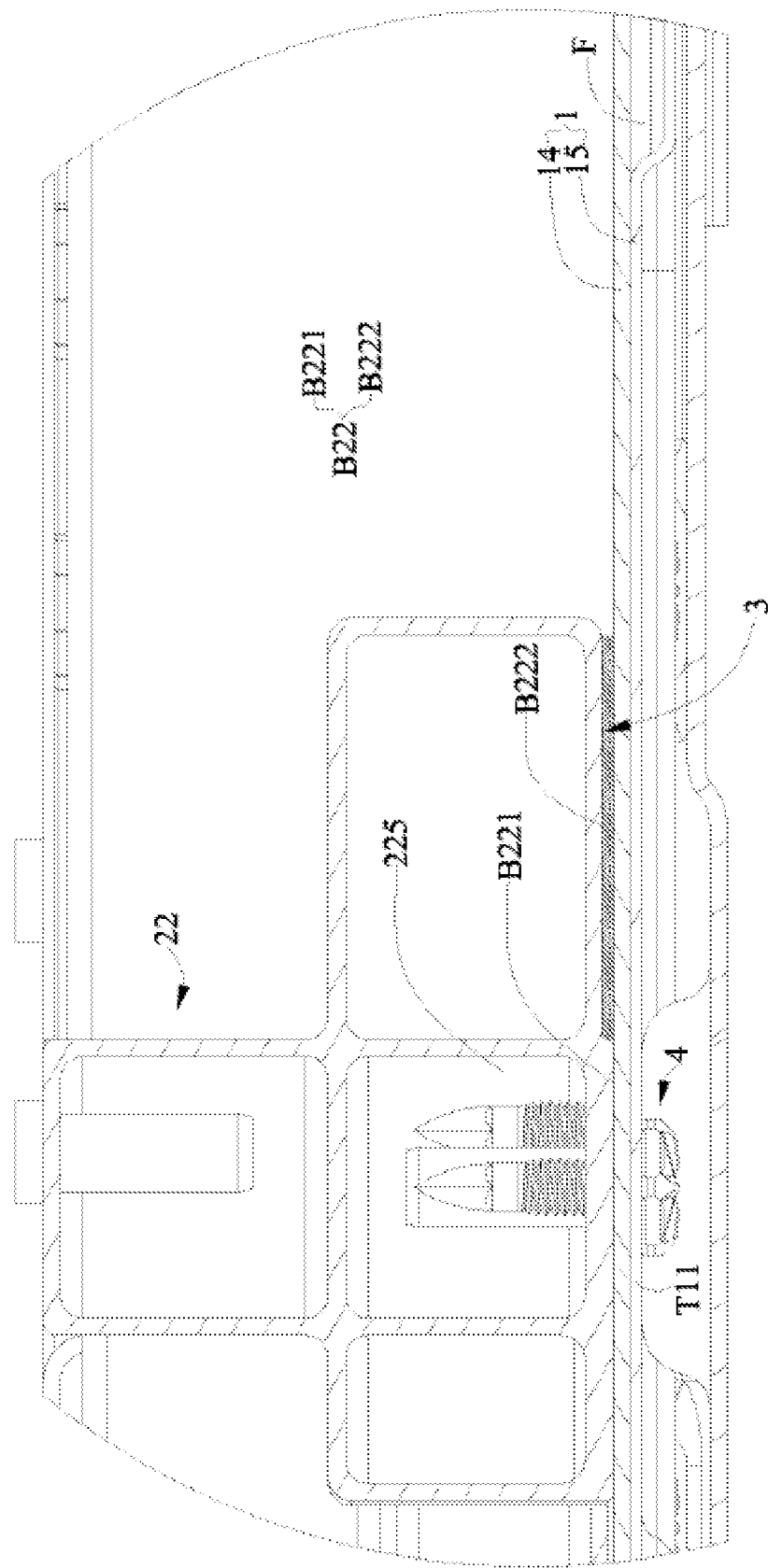
FIG. 5 is an enlarged view of a circled part in FIG. 4.
Figure 6:
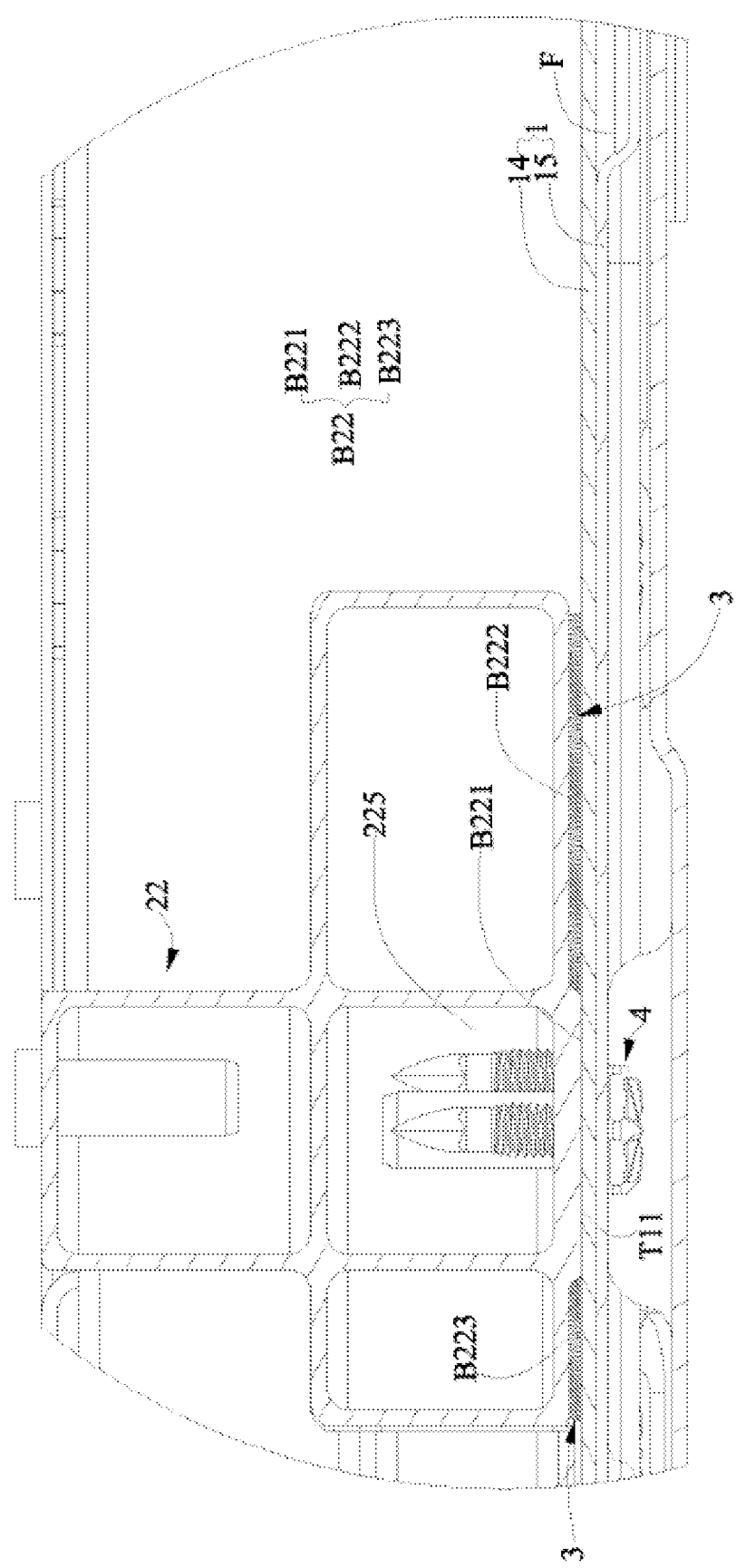
FIG. 6 is a variation of FIG. 5.
Figure 7:
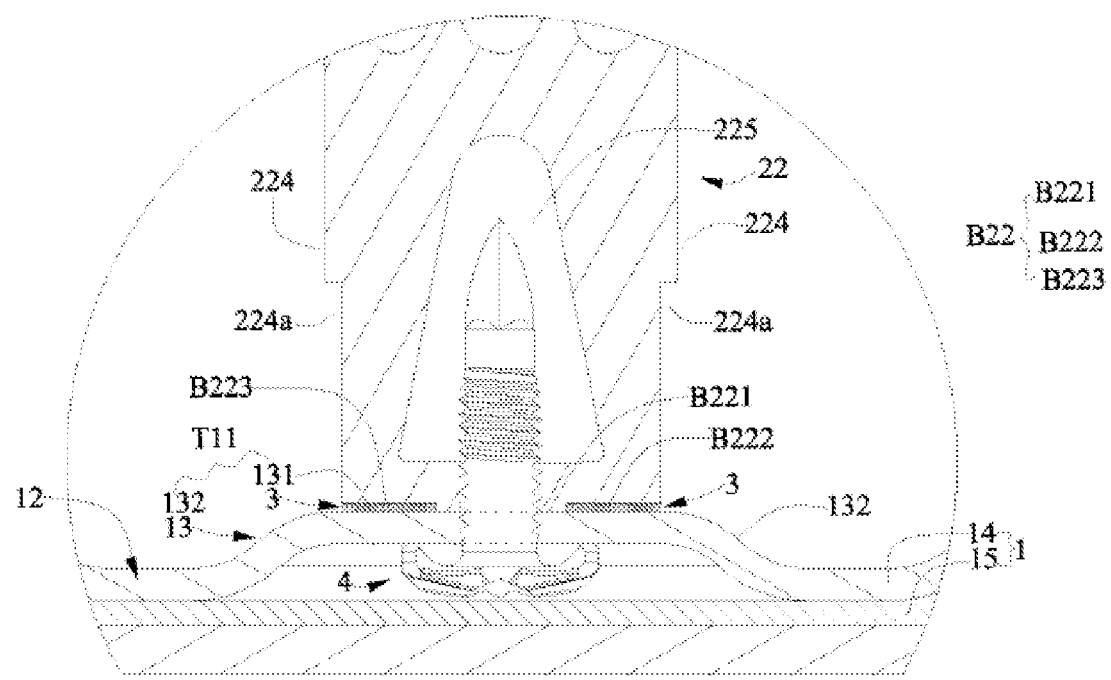
FIG. 7 is another view corresponding to FIG. 5, showing another internal beam of a lower frame body of the battery box according to this application.
Figure 8:
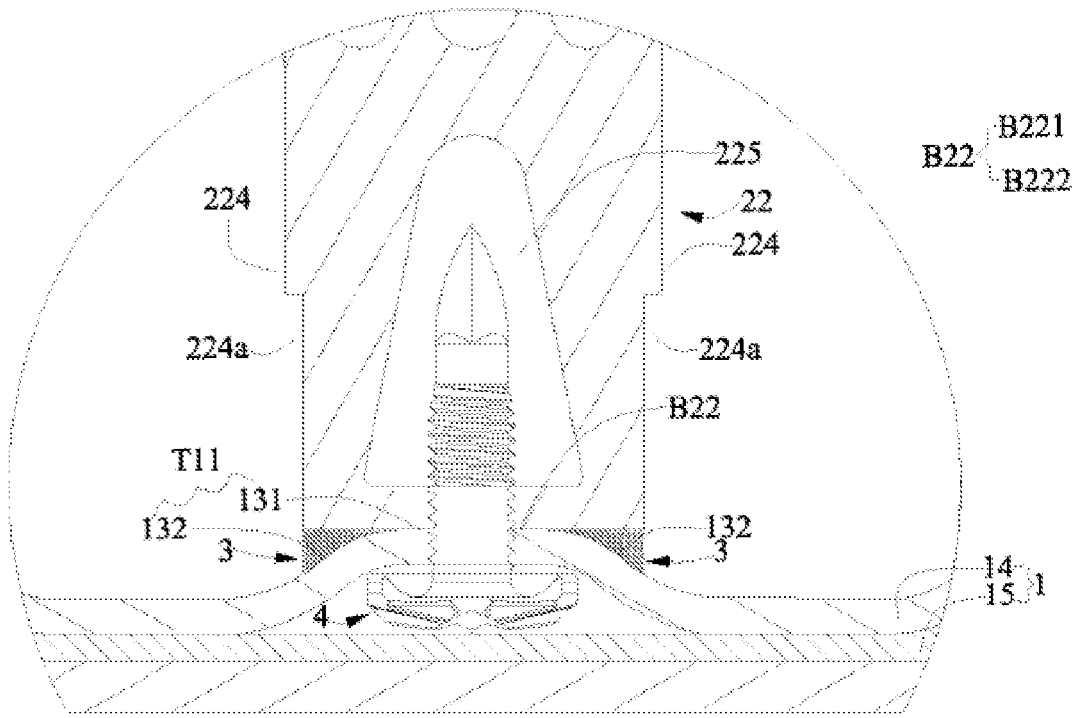
FIG. 8 is a variation of FIG. 7.
Reference signs are described as follows.

FIG. 1 is a perspective view of a battery box according to this application, where battery modules are shown for the sake of clarity. FIG. 2 is an assembled perspective view of the battery box according to this application. FIG. 3 is a top view of FIG. 2. FIG. 4 is a sectional view of FIG. 3. FIG. 5 is an enlarged view of a circled part in FIG. 4. FIG. 6 is a variation of FIG. 5. FIG. 7 is another view corresponding to FIG. 5, showing another internal beam of a lower frame body of the battery box according to this application. FIG. 8 is a variation of FIG. 7.

The battery box according to this application includes a heat exchange plate 1 and a lower frame body 2. The battery box further includes heat insulation glue 3. The battery box further includes a fastener 4, a heat insulation pad 5, and a protective plate 6.

The heat exchange plate 1 is used to support battery modules 7 and exchanges heat with batteries 71 of the battery modules 7. The battery 71 may generally include a housing and an electrode assembly and an electrolyte that are accommodated inside the housing. The electrode assembly includes a positive electrode plate, a negative electrode plate, and a separator. The battery 71 may be a can-type (or hard-case) battery, and accordingly as shown in FIG. 1, and the housing includes a top cover and an outer case fitted with the top cover; or the battery 71 may be a pouch-type (or soft-case) battery, and the case is made of a packaging film (such as an aluminum plastic film). The heat exchange plate 1 includes a first plate 14 and a second plate 15. The second plate 15 joins from below with the first plate 14 to form a flow passage F for a heat exchange medium to flow through, as shown in FIG. 5 and FIG. 6. The first plate 14 and/or the second plate 15 may be formed by stamping. To improve the heat exchange effect, the heat exchange plate 1 is made of a material having high thermal conductivity, preferably a metal material, and more preferably an aluminum alloy material.

The lower frame body 2 is located on the heat exchange plate 1. The lower frame body 2 includes edge beams 21 and internal beams 22. The edge beams 21 form a circumferential closure opened in an up-down direction Z, and the edge beams 21 and the heat exchange plate 1 together form an accommodating space with an upward opening. The internal beams 22 are located inside the accommodating space and divide the accommodating space into sub-accommodating spaces R for placing the battery modules 7, and a bottom plane B22 of the internal beam 22 is partly in contact with a top plane T11 of the heat exchange plate 1 in the up-down direction Z. By making the bottom plane B22 of the internal beam 22 partly in contact with the top plane T11 of the heat exchange plate 1 in the up-down direction Z, the contact area between the bottom plane B22 of the internal beam 22 and the top plane T11 of the heat exchange plate 1 is reduced. This reduces the heat exchange between the heat exchange plate 1 and the bottom plane B22 of the internal beam 22, and in turn the impact on the heat exchange between the heat exchange plate 1 and the battery modules 7 (mainly the batteries 71) is reduced, and the stability, constancy and controllability of the operating temperature of the batteries 71 are improved.

Both the edge beams 21 and the internal beams 22 can be made of a metal material, such as an aluminum alloy, and may use die castings or extrusion profiles. To reduce weight, the edge beams 21 and the internal beams 22 can have cavities (that is, a later described accommodating cavity 225 is present in the internal beam 22, but no cavity is shown for the edge beam 21). In a word, they are profiles with cavities. It is to be noted that, the respective longitudinal directions of the edge beams 21 and the internal beams 22 may be an X direction and their respective transverse directions may be a Y direction, or the longitudinal direction may be a Y direction and the transverse direction may be an X direction. However, in this specification, the transverse direction and the longitudinal direction are directions of a beam structure itself, which constitute a local coordinate system, while the X, Y, and Z directions of the battery box in FIG. 1 form a global coordinate system. There is no strict correspondence between the two coordinate systems.

In an example in FIG. 5, the bottom plane B22 of the internal beam 22 includes: a first plane B221, which is in contact with the top plane T11 of the heat exchange plate 1; a second plane B222, which is recessed upwardly with respect to the first plane B221 from a side of the first plane B221 in a direction that intersects with the up-down direction Z, so that the second plane B222 is spaced apart from the top plane T11 of the heat exchange plate 1 in the up-down direction Z.

Further, in the example in FIG. 5, the heat insulation glue 3 is filled between the second plane B222 of the bottom plane B22 of the internal beam 22 and the top plane T11 of the heat exchange plate. The filling of the heat insulation glue 3 may fill seamlessly a gap between the second plane B222 of the bottom plane B22 of the internal beam 22 and the top plane T11 of the heat exchange plate 1. This prevents heat from transferring to the second plane B222 of the bottom plane B22 of the internal beam 22 through the air by means of heat radiation from the top plane T11 of the heat exchange plate 1. This further reduces the heat exchange between the heat exchange plate 1 and the internal beam 22, and in turn the impact on the heat exchange between the heat exchange plate 1 and the battery modules 7 (mainly the batteries 71) is further reduced, and the stability, constancy and controllability of the operating temperature of the batteries 71 are further improved.

In an example in FIG. 6, on the basis of the embodiment shown in FIG. 5, the bottom plane B22 of the internal beam 22 further includes a third plane B223, which is recessed upwardly with respect to the first plane B221 from another side of the first plane B221 opposite to the direction that intersects with the up-down direction Z, so that the third plane B223 is spaced apart from the top plane T11 of the heat exchange plate 1 in the up-down direction Z. By making the third plane B223 spaced apart from the top plane T11 of the heat exchange plate 1 in the up-down direction Z, the contact area between the bottom plane B22 of the internal beam 22 and the top plane T11 of the heat exchange plate 1 is further reduced. This further reduces the heat exchange between the top plane T11 of the heat exchange plate 1 and the bottom plane B22 of the internal beam 22, and in turn the impact on the heat exchange between the heat exchange plate 1 and the battery modules 7 (mainly the batteries 71) is further reduced, and the stability, constancy and controllability of the operating temperature of the batteries 71 are further improved.

Further, in the example shown in FIG. 6, the heat insulation glue 3 is filled between the third plane B223 and the top plane T11 of the heat exchange plate 1. Again, the filling of the heat insulation glue 3 may fill seamlessly a gap between the third plane B223 of the bottom plane B22 of the internal beam 22 and the top plane T11 of the heat exchange plate 1. This prevents heat from transferring to the third plane B223 of the bottom plane B22 of the internal beam 22 through the air by means of heat radiation from the top plane T11 of the heat exchange plate 1. This further reduces the heat exchange between the heat exchange plate 1 and the internal beam 22, and in turn the impact on the heat exchange between the heat exchange plate 1 and the battery modules 7 (mainly the batteries 71) is further reduced, and the stability, constancy and controllability of the operating temperature of the batteries 71 are further improved.

In the examples in FIG. 5 and FIG. 6, the top plane T11 of the heat exchange plate 1 is flat in general. This improves the flatness for heat exchange with the batteries 71 of the battery modules 7, thereby improving the uniformity of heat exchange. The second plane B222 and the third plane B223 may form a ring, or may not form a ring, which may be dependent on the control of heat exchange.

In examples in FIG. 7 and FIG. 8, the heat exchange plate 1 has a main body 12 and a bulge 13 extending from the main body 12. A downside of the bulge 13 is recessed upwardly with respect to the main body 12, and an upside of the bulge 13 protrudes upwardly with respect to the main body 12. The bulge 13 has a top surface 131 constituting part of the top plane T11 and an inclined plane 132. The inclined plane 132 is located laterally to the top surface 131 along the direction intersecting with the up-down direction Z. The bottom plane B22 of the internal beam 22 is partly in contact with the top surface 131 of the bulge 13, and the inclined plane 132 of the bulge 13 is spaced apart from the top plane T11 of the heat exchange plate 1 in the up-down direction Z. By making the bottom plane B22 of the internal beam 22 partly in contact with the top surface 131 of the bulge 13, and the inclined plane 132 of the bulge 13 spaced apart from the top plane T11 of the heat exchange plate 1 in the up-down direction Z, the contact area between the bottom plane B22 of the internal beam 22 and the top plane T11 of the heat exchange plate 1 is reduced. This reduces the heat exchange between the heat exchange plate and the bottom plane of the internal beam, and in turn the impact on the heat exchange between the heat exchange plate and the battery modules (mainly the batteries) is reduced, and the stability, constancy and controllability of the operating temperature of the batteries are improved. Moreover, the provision of the bulge 13 also helps to strengthen the performance of the internal beam 22 to buffer against outside shocks.

Further, in the examples in FIG. 7 and FIG. 8, the heat insulation glue 3 is filled between the bottom plane B22 of the internal beam 22 and the inclined plane 132 of the bulge 13. Again, the filling of the heat insulation glue 3 may fill seamlessly a gap between the bottom plane B22 of the internal beam 22 and the inclined plane 132 of the bulge 13. This prevents heat from transferring to the bottom plane B22 of the internal beam 22 through the air by means of heat radiation from the inclined plane 132 of the bulge 13 of the heat exchange plate 1. This further reduces the heat exchange between the heat exchange plate 1 and the internal beam 22, and in turn the impact on the heat exchange between the heat exchange plate 1 and the battery modules 7 (mainly the batteries 71) is further reduced, and the stability, constancy and controllability of the operating temperature of the batteries 71 are further improved.

In the example in FIG. 7, the bottom plane B22 of the internal beam 22 is similar to that in FIG. 6; in the example in FIG. 8, the bottom plane B22 of the internal beam 22 is flat.

In the examples in FIG. 7 and FIG. 8, a notch 224a is provided on a lateral surface 224 of the internal beam 22 facing toward the battery. The provision of the notch 224a can reduce the contact area of the lateral surface of the battery module 7 with the internal beam 22 in case of impact vibration, reducing the level of unexpected heat exchange. Moreover, the notch 224a may also reduce the weight of the internal beam 22, helping the weight reduction of the battery box.

In the examples in FIG. 5 to FIG. 8, the internal beam 22 has an accommodating cavity 225 located above a location where the bottom plane B22 of the internal beam 22 contacts the top plane T11 of the heat exchange plate 1. A fastener 4 passes through the heat exchange plate 1 and the internal beam 22 at the location where the bottom plane B22 of the internal beam 22 contacts the top plane T11 of the heat exchange plate 1 and extends into the accommodating cavity 225. A part of the fastener 4 extending into the accommodating cavity 225 is spaced apart from a wall of the accommodating cavity 225. In this way, the part of the fastener 4 extending into the accommodating cavity 225 is prevented from coming into contact with the wall of the accommodating cavity 225, so the heat exchange area between the internal beam 22 and the heat exchange plate 1 will not increase because of the fastener 4.

A material of the heat insulation glue 3 may be selected from any suitable materials, such as polyurethane heat insulation glue and heat insulation epoxy glue.

The fastener 4 is configured to fix the heat exchange plate 1 to the lower frame body 2. The fastener 4 may use any suitable forms, such as a rivet, a combination of a bolt and a nut, or a screw. A material of the fastener 4 is preferably a material with low thermal conductivity.

A heat insulation pad 5 is provided under the heat exchange plate 1, as shown in FIG. 1. With the provision of the heat insulation pad 5, heat transfer of the heat exchange plate 1 is blocked in at least the downward direction, which facilitates heat preservation for the batteries 71 of the battery module 7. A material of the heat insulation pad 5 may be heat insulation cotton, foam, or the like.

A protective plate 6 supports the heat insulation pad 5 and the heat exchange plate 1 from below, as shown in FIG. 1. Under the impact of an external force (for example, flying rocks), the protective plate 6 protects the heat exchange plate 1 from failure due to damage by the external force. A material of the protective plate 6 is preferably a material with strong impact resistance, such as an aluminum alloy, a stainless steel, a high-strength steel, and a hot dip galvanized dual-phase DP high-strength alloy steel.

The above detailed description describes various example embodiments, but this specification is not intended to be limited to the specifically disclosed combinations. Therefore, unless otherwise stated, the various features disclosed herein can be combined together to form a plurality of additional combinations that are not shown for the sake of clarity.

What is claimed is:

1. A battery box, comprising:
    a heat exchange plate comprising a first plate and a second plate, wherein the second plate joins from below with the first plate to form a flow passage therebetween for a heat exchange medium to flow through;
    a lower frame body located on the first plate of the heat exchange plate, wherein the lower frame body comprises edge beams and internal beams, the edge beams form a circumferential closure opened in an up-down direction, the edge beams and the first plate of the heat exchange plate together form an accommodating space with an upward opening, and the internal beams are located inside the accommodating space and divide the accommodating space into sub-accommodating spaces for placing battery modules; the heat exchange plate is configured to support the battery modules and exchanges heat with batteries of the battery modules, and at least one portion of a bottom plane of the internal beam is spaced in part and not in contact with a top plane of the first plate of the heat exchange plate in the up-down direction, and the at least one portion of the bottom plane of the internal beam is heat insulated from the top plane of the first plate of the heat exchange plate, at least one of the internal beams has an accommodating cavity located above a location where the bottom plane of the internal beam contacts the top plane of the first plate of the heat exchange plate;
    a heat insulation glue filled between the at least one portion of the bottom plane of the internal beam and the top plane of the first plate of the heat exchange plate; and
    a fastener selected from at least one of a rivet, a combination of a bolt and a nut, and a screw, wherein the fastener passes through the first plate of the heat exchange plate and the internal beam at a location where the bottom plane of the internal beam contacts the top plane of the first plate of the heat exchange plate and extends into the accommodating cavity to fix the heat exchange plate to the lower frame body.

2. The battery box according to claim 1, wherein the bottom plane of the internal beam further comprises:
    a first plane, which is in contact with the top plane of the heat exchange plate; and
    a second plane, which is recessed upwardly with respect to the first plane from a side of the first plane in a direction that intersects with the up-down direction, wherein the at least one portion of the bottom plane of the internal beam comprises the second plane, and the second plane is spaced apart from the top plane of the first plate of the heat exchange plate in the up-down direction.

3. The battery box according to claim 2, wherein the bottom plane of the internal beam further comprises a third plane, which is recessed upwardly with respect to the first plane from another side of the first plane opposite to the direction that intersects with the up-down direction, wherein the at least one portion of the bottom plane of the internal beam comprises the third plane, and the third plane is spaced apart from the top plane of the first plate of the heat exchange plate in the up-down direction.

4. The battery box according to claim 3, wherein the heat insulation glue is filled between the third plane and the top plane of the first plate of the heat exchange plate.

5. The battery box according to claim 1, wherein the top plane of the first plate of the heat exchange plate is flat in general.

6. The battery box according to claim 1, wherein the first plate of the heat exchange plate has a main body and a bulge extending from the main body, wherein a downside of the bulge is recessed upwardly with respect to the main body, and an upside of the bulge protrudes upwardly with respect to the main body, the bulge has a top surface constituting part of the top plane and an inclined plane, the inclined plane is located laterally to the top surface along the direction intersecting with the up-down direction, the bottom plane of the internal beam is partly in contact with the top surface of the bulge, and the inclined plane of the bulge is spaced apart from the top plane of the first plate of the heat exchange plate in the up-down direction.

7. The battery box according to claim 6, wherein the heat insulation glue is filled between the bottom plane of the internal beam and the inclined plane of the bulge.

8. The battery box according to claim 1, wherein a notch is provided on a lateral surface of the internal beam facing toward the battery modules.

9. The battery box according to claim 1, wherein a part of the fastener extending into the accommodating cavity is spaced apart from a wall of the accommodating cavity.

10. The battery box according to claim 1, wherein the edge beams and the internal beams are both provided with cavities for reducing weight.

11. The battery box according to claim 1, wherein the bottom plane of the internal beam is a flat surface.

12. The battery box according to claim 1, wherein a heat insulation pad is provided under the heat exchange plate.

13. The battery box according to claim 12, wherein a protective plate is provided under the heat insulation pad to support the heat insulation pad and the heat exchange plate from below.

* * * * *